Aug. 5, 1958    J. M. STEWART    2,846,089
BULK FEEDING APPARATUS

Filed Aug. 3, 1954    3 Sheets-Sheet 1

INVENTOR
JAMES M. STEWART
BY
ATTORNEY

Aug. 5, 1958 J. M. STEWART 2,846,089
BULK FEEDING APPARATUS
Filed Aug. 3, 1954 3 Sheets-Sheet 2
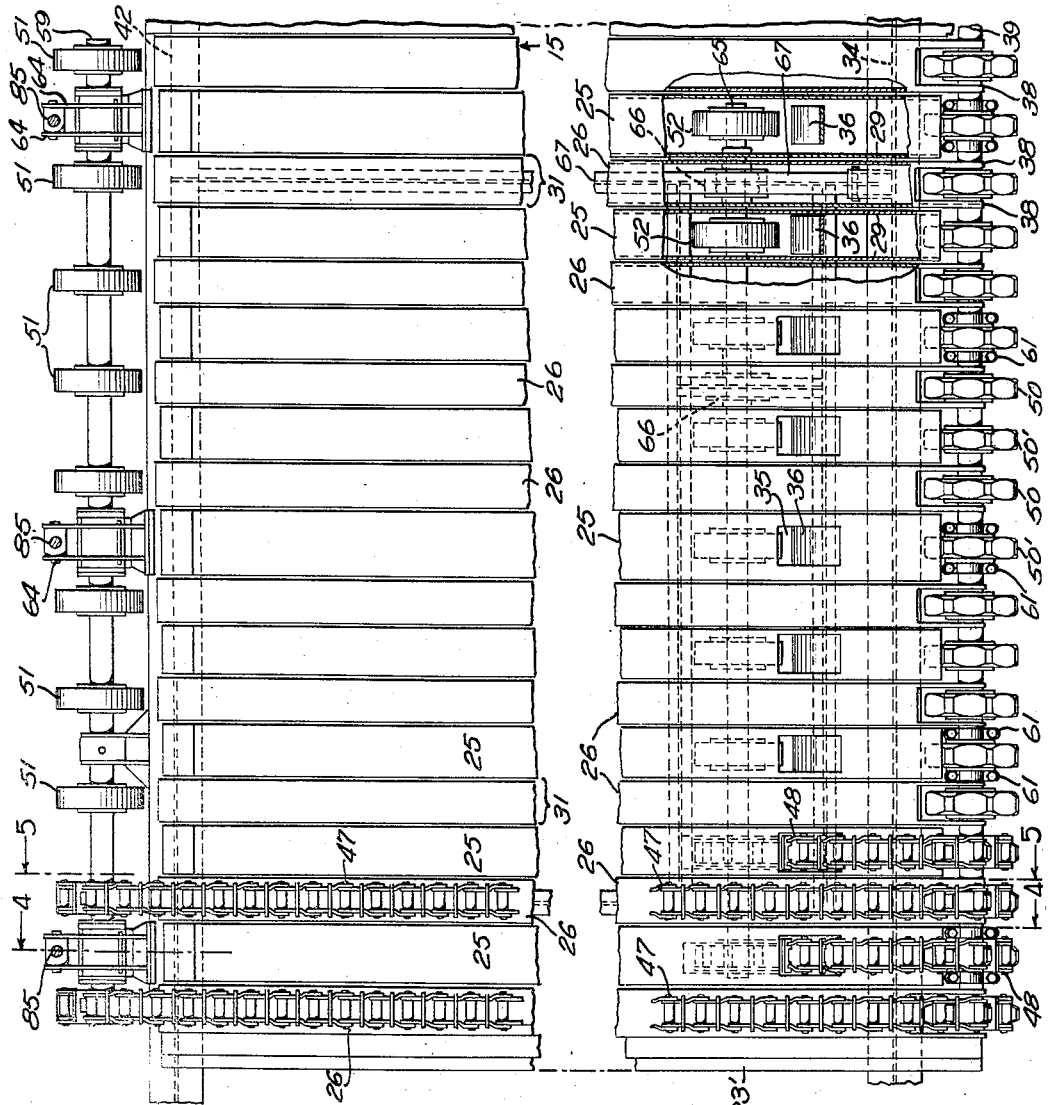
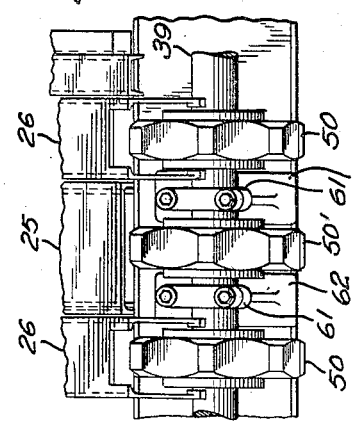
INVENTOR.
JAMES M. STEWART
BY
Francis Wentworth Jr
ATTORNEY

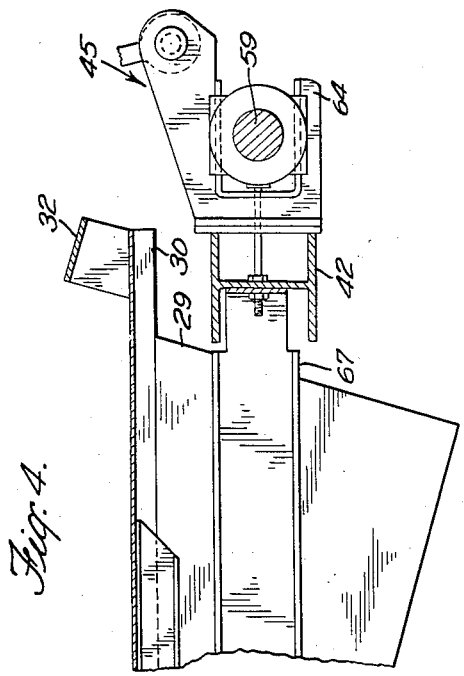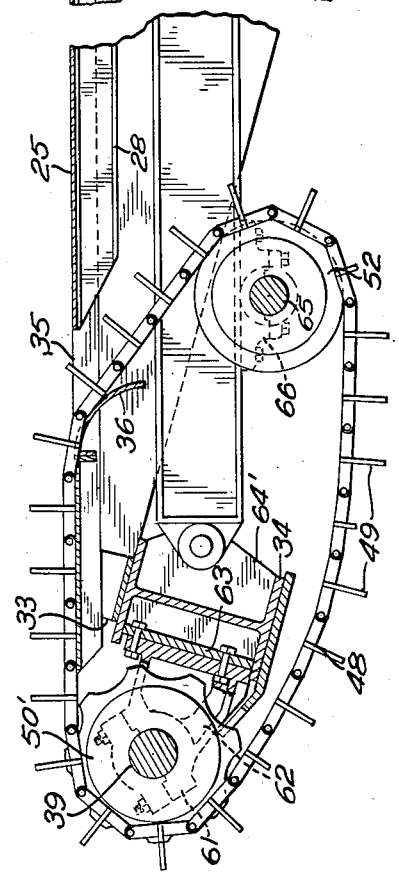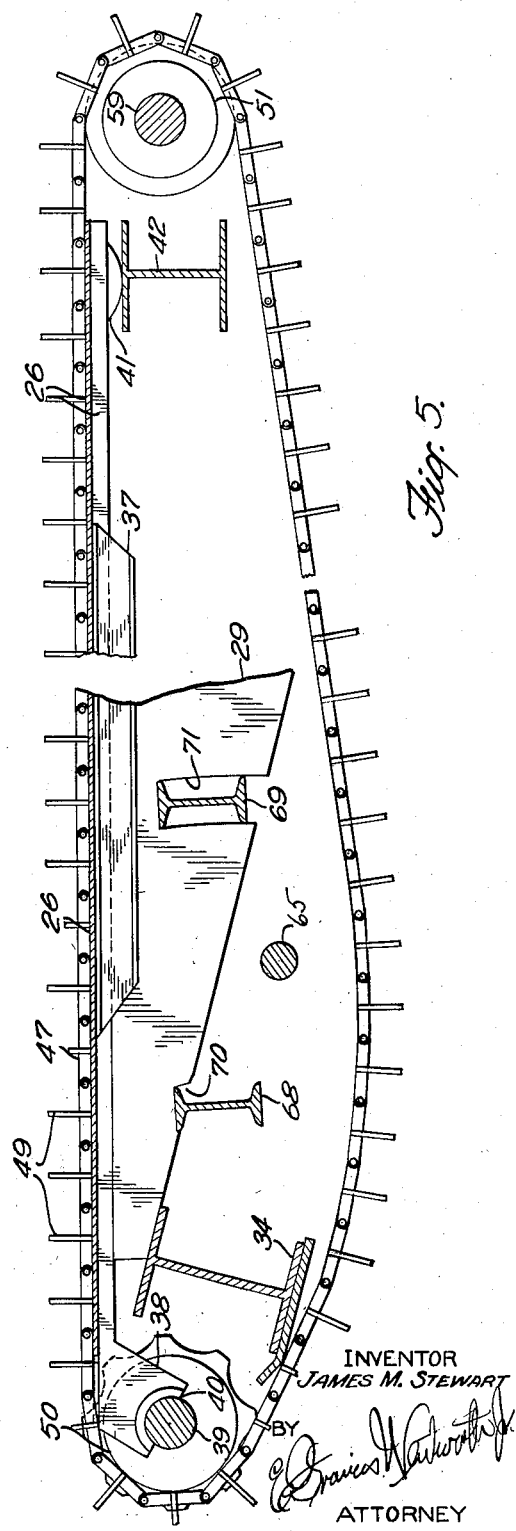

United States Patent Office 2,846,089
Patented Aug. 5, 1958

2,846,089
BULK FEEDING APPARATUS

James M. Stewart, St. Catharines, Ontario, Canada

Application August 3, 1954, Serial No. 447,538

14 Claims. (Cl. 214—17)

This invention relates to apparatus for handling bulk waste material and more particularly to apparatus for the combined storage and controlled feeding of the stored material from said apparatus.

In many manufacturing industries, a waste bulk material is produced in manufacturing the resultant product. This waste material is usually stored in a large bin until it is removed from the bin for disposal. For example, in the production of lumber, waste bulk material, such as hogged papermill bark and sawdust, is stored in a bin until such time as it can be fed to a furnace to be burned or in the manufacture of wooden articles, or wooden parts of articles such as agricultural implements, the waste wood refuse is stored until ready to be fed to an oven to be made into kiln dried wood refuse. The storage bin in which the waste bulk material is stored is commonly designed with reversed battered sides to prevent the material from hanging up therein and is provided with a live bottom to positively remove all material to the furnace for burning or to the other apparatus for further processing. This live bottom or feeder is generally of a drag-type conveyor or multiple screw or auger-type conveyor. The difficulty with such conveyors is that there is a tendency to pack the material against the end wall of the storage bin just above the discharge end of the conveyor which results in an extremely severe overload on the feeder and causes it to break down. This also causes, in some cases, excessive pressures on the end wall gate above the discharge end of the conveyor.

In accordance with the present invention, apparatus is provided for the storage of waste material therein having a positive removal type of feeder with a pivotal adjustment to prevent overloading of the feeder and breakdown thereof.

The invention further provides for the storage of bulk material in a storage bin and controlled feeding of said material from the bin which prevents excessive pressures on the bin gate above the discharge end of the feeder.

The invention together with its various features and objects will be understood by reference to the accompanying drawings, in which:

Fig. 2 is a fragmentary plan view, partly broken away, of the apparatus of Fig. 1 taken on line 2—2 of Fig. 1;

Fig. 3 is an enlarged fragmentary view, in elevation, of the lower portion of the apparatus, shown in Fig. 2;

Fig. 4 is an enlarged sectional view taken along line 4—4 of Fig. 2; and

Fig. 5 is an enlarged sectional view taken along line 5—5 of Fig. 2.

Like characters of reference refer to similar parts throughout the drawings.

Figure 1:
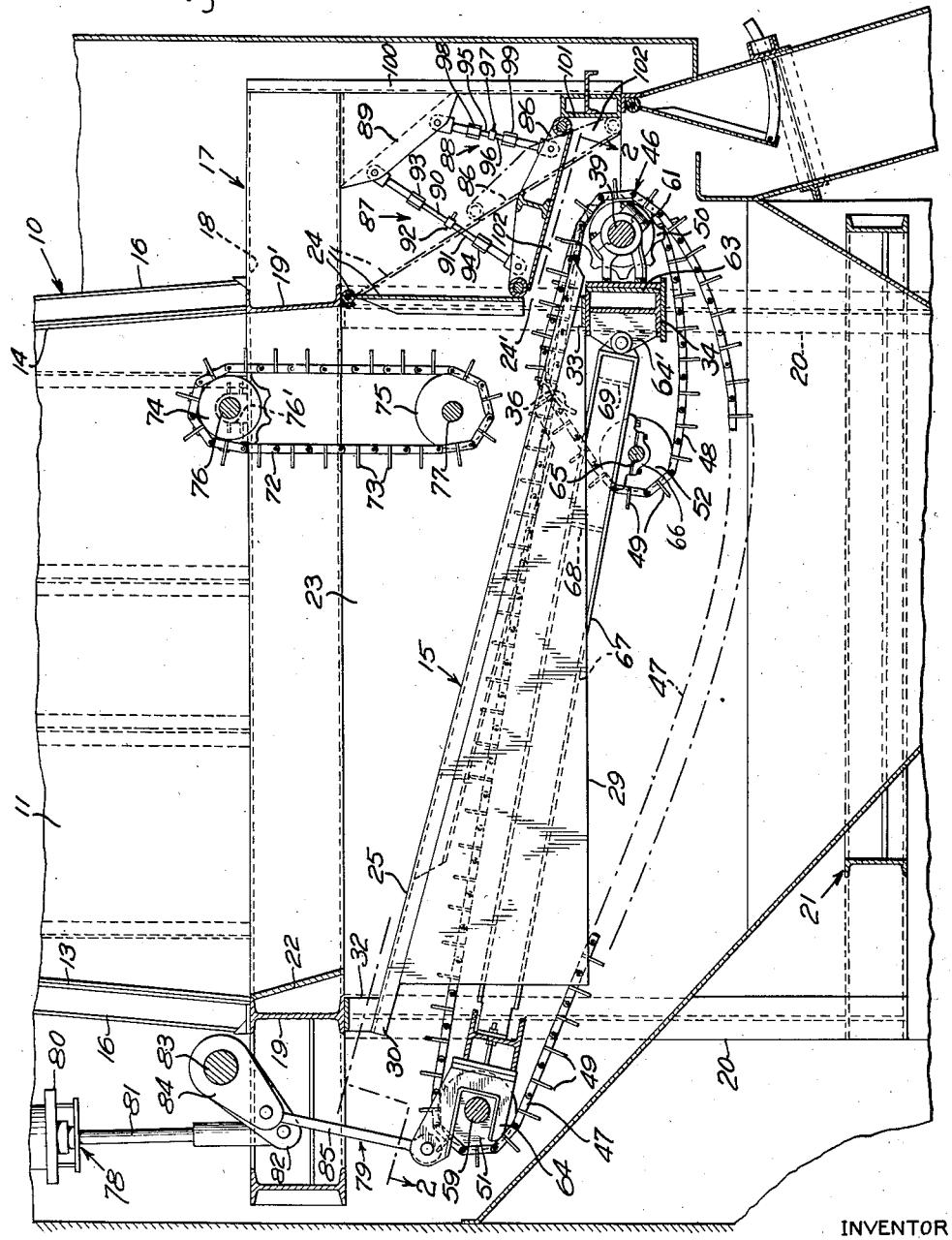
Fig. 1 is a longitudinal section view, in elevation, of the apparatus of the present invention.

Referring to the drawings, the reference character 10 designates a storage bin for bulk waste material and comprises opposite side walls, only one wall 11 (Fig. 1) of which is shown, vertically inclined end walls 13 and 14 (Fig. 1) and a bottom or floor 15. The side and end walls are reinforced by a plurality of vertical I-beams 16 spaced along the outside thereof. I-beams 16 are supported at their lower end by a horizontal frame 17. Frame 17 extends around the lower portion of the bin and comprises spaced I-beams 18 extending below the side walls, and spaced across beams 19 and 19' extending below end walls 13 and 14, respectively. Frame 17 is supported by a plurality of spaced vertical posts or columns 20 (Fig. 1) which in turn are supported by a bin foundation 21 (Fig. 1), only a portion of which is shown. The upper ends of columns 20 are secured to the lower edges of beams 19 and 19'. The lower ends of columns 20 are secured to the upper portion of foundation 21.

A guide plate 22 (Fig. 1) is secured to the lower edge of end wall 13 which plate is coextensive therewith and extends downwardly and inwardly of the bin to a point in spaced relationship with the portion of the bin floor 15 adjacent wall 13. Extension plates 23 (Fig. 1) and 23' (Fig. 2) are joined to the lower edges of the side walls and extend downwardly in the bin substantially below bin floor 15 to prevent bulk material from falling out between the sides and floor of the bin. A discharge gate 24 is pivotally secured to the lower edge of cross beam 19' and extends downwardly in spaced relationship with the portion of bin floor 15 therebelow to provide a bin discharge outlet 24' between the lower edge of said gate and bin floor. Gate 24 extends between the bin side walls.

Bin floor 15 comprises a plurality of inclined stationary channel members 25, and pivotally adjustable channel members 26. Stationary members 25 extend from adjacent end wall 13 to a point substantially beyond discharge gate 24 and are disposed between the side walls.

Members 25 are spaced apart from one another to provide openings therebetween and have I-beam stiffeners 28 (Fig. 4) welded to the web thereof. Downwardly extending triangular plates 29 (Figs. 1 and 4) are welded to the longitudinal edges of legs 30 (Figs. 1 and 4) of member 25 to provide channelways 31 (Fig. 2) therebetween. Each of the channel webs of members 25 is provided with a rectangular slot 35 (Figs. 2 and 4) in the end thereof adjacent bin discharge gate 24. A curved plate 36 is secured to the forward edge of slot 35 and extends into the latter and downwardly below the bin floor in a direction toward bin wall 13. Member 25 is supported by struts 32 and 33 (Fig. 4) secured to the cross beam 19 and a horizontally extending beam 34, respectively. Strut 32 is secured to the web face of channel member 25 adjacent end wall 13, and strut 33 is secured to the web adjacent bin discharge gate 24. The ends of beam 34 are fixed to columns 20 adjacent end wall 14 of the bin. Pivotally adjustable members 26 are disposed in the bin in channelways 31 between members 25 and extend from adjacent end wall 13 to a point substantially beyond discharge gate 24. I-beam stiffeners 37 (Fig. 5) are welded to the web of member 26. Member 26 is supported by a pair of struts 38 (Figs. 2 and 5) secured to the end thereof adjacent discharge gate 24 and by a support 41 secured to the opposite end thereof. Struts 38 are pivotally supported on a horizontally extending drive shaft 39 by half sleeve bearings 40 (Fig. 5) while support 41 is carried by a horizontal I-beam 42 which extends between columns 20 adjacent end wall 13.

A material feeder 46 is disposed adjacent the bottom of the bin and comprises a plurality of endless drive chains 47 (Figs. 1 and 5) and 48 (Figs. 1 and 4) with spaced rectangular shaped teeth 49 which bite into the material in the bottom of the bin and drag it toward the bin discharge outlet 24'. Drive chains 47 have a portion which extends beyond bin discharge outlet 24' to engage a driver sprocket wheel 50 (Fig. 5) and another portion which extends beyond columns 20 adjacent end wall 1 to engage an idler traction wheel 51.

Drive chains 48 have a portion which extends beyond discharge outlet 24' to engage a driver sprocket wheel 50' and another portion which extends through slot 35 of member 25 to engage an idler traction wheel 52.

Sprocket wheels 50 are positioned in alignment with the ends of adjustable floor members 26 adjacent beam 34, and are fixed to shaft 39 for rotation therewith. Sprocket wheels 50' are fixed to shaft 39 in alignment with the ends of stationary floor members 25 adjacent beam 34. Shaft 39 is carried by a plurality of split bearings 61 (Figs. 3 and 4) having yokes 62 bolted to flanges 63 on cross beam 34.

Idler wheels 51 are carried by a horizontal shaft 59 and are spaced along the shaft in alignment with sprocket wheels 50 on shaft 39. Shaft 59 is supported by a plurality of U-shaped bearing guides 64 (Fig. 4) secured to beam 42. Idler wheels 52 are carried by a horizontal shaft 65 which extends adjacent and below slot 35 of member 25. Idler wheels 52 are spaced on shaft 65 in alignment with sprocket wheels 50'. Shaft 65 is supported by a plurality of split bearings 66 (Fig. 4) secured to beams 67 extending parallel to stationary members 25. Beams 67 are disposed directly below members 25 and are pivotally connected at the end thereof adjacent gate 24 to vertical flanges 64' (Fig. 4) of beam 34 and bolted at the opposite end thereof to beam 42. I-beams 68 and 69 (Figs. 1 and 4) are secured to the adjacent sides of the beams 67 and prevent relative movement of beams 67 with respect to one another. Slots 70 and 71 (Fig. 5) are provided in plates 29 to permit movement of beams 67 to a maximum upward position to be hereinafter described.

Bin 10 is also provided with a plurality of vertical drive chains 72 (Fig. 1) having spaced teeth 73. Drive chains 72 are disposed in the lower portion of the bin adjacent end wall 14 and discharge gate 24. A portion of chain 72 engages a drive sprocket wheel 74 (Fig. 1) and another portion engages an idler traction wheel 75 (Fig. 1). Sprocket wheels 74 are spaced along a horizontally extending shaft 76 (Fig. 1) and are fixed thereto for rotation by the shaft. Shaft 76 is supported in bearings 76' (Fig. 1) carried by beams 18. Idler wheels 75 are spaced in alignment with sprocket wheels 74 along a horizontally extending shaft 77 (Fig. 1) located below shaft 76 and supported by means not shown. Shaft 76 is driven in a counterclockwise direction, rotating sprocket wheels 74 and drive chains 72 in a counterclockwise direction to prevent bulk material in the bin from becoming compressed and hanging up against the lower portion of end wall 14 and discharge gate 24 by the continuous agitation of the material.

The bin material feeder 46 and adjustable floor members 26 are connected to a hydraulic actuating means 78 (Fig. 1) through a linkage 79 (Fig. 1) for pivotal movement about beam 34. Hydraulic means 78 is positioned to the left of end wall 13 as seen in Fig. 1 and comprises a cylinder 80 and a piston rod 81. Cylinder 80 is pivotally connected at the upper end thereof by means not shown to a support means to permit movement of the cylinder and piston rod in a plane parallel to the side walls of the bin. Piston rod 81 is pivotally connected at the lower end thereof to and between a pair of crank arms 82 one of which is shown in Fig. 1. The opposite ends of arms 82 are fixed to a horizontal shaft 83 (Fig. 1) for rotation therewith. Shaft 83 extends along end wall 13 and is supported in bearings secured to beams 18 of frame 17. A plurality of spaced link arms 84 (Fig. 1) are fixed to shaft 83 and have their opposite ends pivotally connected to link rods 85. The opposite ends of rods 85 are pivotally connected to bearing guides 64. Crank arms 82 and link arms 84 are fixed on shaft 83 to extend therefrom in a downwardly inclined direction away from end wall 13 so they do not contact wall 13 when actuated by the hydraulic means 78.

Gate portion 86 (Fig. 1) is pivotally secured to the lower edge of gate 24 and is pivotally connected to adjustable screw jacks 87 (Fig. 1) and 88 at each end thereof which jacks are in turn pivotally connected to a plurality of struts 89. Jack 87 comprises externally and oppositely threaded screw portions 90 and 91 between which is fixed a handle 92. Screw portions 90 and 91 are adapted for threading into internally threaded sleeves 93 and 94, respectively. Jack 88 comprises externally and oppositely threaded screw portions 95 and 96 with a handle 97 fixed therebetween and which are adapted for threading into internally threaded sleeves 98 and 99, respectively. One end of strut 89 is secured to frame 17 and the other end to a vertical structural member 100 which extends downwardly from frame 17 in spaced relationship with discharge gate 24. The lower edge of gate portion 86 is disposed in abutting and sliding relationship with a structural guide member 101 secured to the lower end of member 100 and said lower edge is restrained from movement in a horizontal direction thereby. Gate 24 is restrained from moving toward vertical drive chain 72 by the horizontal load of material being discharged through opening 24, as hereinafter described. Gate 24 takes up position according to the location of gate portion 86. Gate portion 86 and bin floor 15 define an outlet passage 102 therebetween, the shape of which may be varied by changing the overall length of screw jacks 87 and 88. The shape of outlet passage 102 varies from that shown in solid lines in Fig. 1 to the shape shown in broken lines therein. When outlet pasage 102 has assumed the shape shown in broken lines, it will be noted gate 24 is in its maximum open position, as shown in broken lines in Fig. 1.

In operation, the bulk material is introduced into the top of bin 10 and falls therein to the bin floor 15 where it is supported by floor members 25 and 26. When it is desired to remove the material from the bin, discharge gate 24 and gate portion 86 are adjusted to provide the desired opening for discharge outlet 24' and shape for outlet passage 102.

When it is desired to displace the gate 24 from a maximum open position, as shown in broken lines in Fig. 1, to the minimum open position which provides a minimum height for discharge outlet 24', as shown in solid lines in Fig. 1, handle 92 of jack 87 is actuated to back out oppositely threaded screw portions 90 and 91 from sleeves 93 and 94, respectively, until the overall length of jack 87 is increased to its maximum length. Simultaneously, handle 97 of jack 88 is actuated to thread oppositely threaded screw portions 95 and 96 into sleeves 98 and 99, respectively, until the overall length of jack 88 is decreased to its minimum length. As a result the upper part of gate portion 86 moves toward bin floor 15 and the lower part away therefrom thereby changing the shape of outlet passage 102. Guide member 101 prevents the lower edge of gate portion 86 from moving in a horizontal direction to the right as seen in Fig. 1. Since the lower edge of gate 24 is pivotally connected to gate portion 86, it takes up position according to the location of said gate portion.

When it is desired to displace the gate 24 from the minimum open position to the maximum open position, to provide a maximum height for discharge outlet 24', handles 92 and 97 of the jacks are simultaneously actuated to thread screw portions 91 and 92 into sleeves 93 and 94, respectively, and back out screw portions 95 and 96 from sleeves 98 and 99, respectively, until the overall length of jack 87 is decreased to a minimum, and the length of jack 88 is increased to a maximum. Thus, with the gate arrangement of the present invention, an infinite adjustment is provided for discharging widely varying mixtures of bulk material therefrom.

A variable drive means, not shown, rotates drive shaft 39 and sprocket wheels 50 and 50' fixed thereto, in a clockwise direction. Sprocket wheels 50 engage drive chains 47 and move the portion of the chain disposed in the bottom of the bin toward discharge outlet 24'. The portion of the drive chain 47 engaging idler 51 rotates it about shaft 59 in a clockwise direction. Sprocket wheels 50' engage drive chains 48 and move the portion of the chain disposed in the bin toward discharge outlet 24'. The portion of a drive chain 48 engaging idler 52 rotates the latter about shaft 65 in a clockwise direction. Teeth 49 of drive chains 47 and 48 bite into the material and drag it through discharge outlet 24'.

Vertical drive chains 72 in the lower portion of the bin adjacent discharge gate 24 are driven in a counterclockwise direction by sprocket wheels 74 and shaft 76. Teeth 73 of drive chains 72 bite into the material to keep it in continuous agitation to prevent material from being compressed and hanging up against the lower portion of end wall 14 and discharge gate 24.

When the piston rod of hydraulic actuating means 78 is in its maximum upward position, adjustable floor members 26 are positioned in horizontal alignment with stationary floor members 25 therebetween and members 25 and members 26 carry a substantial portion of the vertical load or weight of the material in the bin. Teeth 49 of drive chain 47 project above bin 15 in contact with the material therein for substantially the entire distance between wall 13 and discharge gate 24. As the material is dragged by teeth 49 toward bin discharge outlet 24' the bulk material tends to cling or stick together and more material is carried toward discharge gate 24 than can be passed through outlet 24'. This surplus material becomes compressed and hangs up or impinges against gate 24 and end wall 14 and will cause the chains or other parts of the bin feeder to become overloaded and to break down unless this load on the chains or feeder is reduced.

In accordance with the present invention, when it appears that the load on chains 47 and 48 is becoming excessive because of hang up adjacent the discharge opening, hydraulic actuating means 78 is actuated to move piston rod 81 to its lowermost position, as shown in Fig. 1. Piston rod 81 in moving to its lowermost position, rotates crank arm 82, shaft 83 and link arms 84 in a counterclockwise direction to move link rods 85 in a downward direction. Rods 85, in turn, causes beams 67 and drive chain 47 to be pivoted in a clockwise direction about drive shaft beam 34, to its lowermost position as shown in Fig. 1. This lowers a substantial portion of members 26 below members 25 of bin floor 15, members 26 with drive chains 47 moving in a downward direction in channel ways 31. Thus, only the portion of drive chain 47 with teeth 49 supported on member 26 adjacent discharge gate 24 is left projecting above the bin floor to bite into a smaller portion of material in the bin and drag it toward outlet 24'. The horizontal load against the lower portion of end wall 14 and discharge gate 24 caused by the surplus material carried adjacent discharge outlet 24' is thereby reduced to avoid overloading of the drive chains and other parts of the bin feeder and prevent break down thereof.

When drive chains 47 are disposed in either the maximum lowermost or uppermost positions, the drive chain 48 supported on member 25 is also pivoted or rotated about drive shaft beam 34 by shaft 65 and split bearing 66 secured to beams 67. Since shaft 65 and bearing 66 are supported by the portion of beam 67 adjacent drive shaft beam 34, drive chains 48 are pivoted through a small arc and the effective length of teeth 49 remains unchanged.

Inasmuch as various changes may be made in the particular form, location and arrangement of the parts of the apparatus disclosed and in the steps of the process and other sequences as disclosed without departing from the principles of the invention, it will be understood that the invention is not to be limited excepting by the scope of the appended claims.

What is claimed is:

1. In combination, a storage receptacle having side and end walls and a floor therein, said receptacle having a discharge outlet in the lower portion thereof, said floor comprising a plurality of stationary and pivotally adjustable members extending longitudinally of the receptacle from a point beyond one end wall thereof to a point adjacent the other end wall, said stationary members being spaced apart from one another and disposed transversely of the receptacle between the side walls thereof, said pivotally adjustable members being positioned in the spaces between said stationary members, feeder means positioned on said stationary and pivotally adjpustable members for carrying material in the receptacle to said discharge outlet, and pivotal means operatively connected to the adjustable members and feeder means to pivot them in a vertical direction about an axis adjacent said discharge outlet.

2. The combination of claim 1 wherein the feeder means comprises a plurality of endless roller type drive chains having spaced teeth thereon.

3. The combination of claim 1 wherein the stationary and pivotally adjustable floor members are inclined toward the receptacle discharge outlet.

4. In combination, a storage receptacle having side and end walls and a floor therein, means forming a discharge outlet below one of said end walls, said floor comprising a plurality of stationary and pivotally adjustable members extending from a point beyond said one end wall to a point adjacent the other end wall, said stationary members being spaced apart from one another and having slots in the portion thereof adjacent said one end wall, said pivotally adjustable members being positioned in the spaces between said stationary members, driver sprocket wheels in alignment with the ends of said stationary and adjustable members adjacent said one end wall, idler wheels in alignment with the ends of said adjustable member opposite said one end wall, other idler wheels disposed below said stationary members in alignment with said slot therein, a plurality of endless drive chains having spaced teeth thereon, portions of said drive chains supported on said adjustable members extending through said discharge outlet and engaging said driver sprocket wheels and said idler wheels in alignment with said adjustable members, another plurality of endless drive chains having spaced teeth thereon, portions of said other drive chains supported on said stationary members and extending through said slots therein and said discharge outlet, said last-mentioned portions engaging the sprocket wheels in alignment with said stationary member and said other idler wheels, and pivotal means operatively connected to move the adjustable members, drive chains, and other drive chains in a vertical direction about an axis adjacent to and extending parallel to the one end wall of said receptacle.

5. In combination, a storage receptacle having side and end walls and a floor therein, means forming a discharge outlet below one of said end walls, adjustable gate means for varying the size of said discharge outlet, feeder means for carrying material from the receptacle to the discharge outlet, and means operatively connected to said feeder means to pivot the feeder means in a vertical direction about an axis parallel to said discharge outlet to control the quantity of material carried to the outlet.

6. The apparatus of claim 5 wherein the gate means comprises a gate, pivotally supported at an upper end and extending transversely of the receptacle side walls.

7. The apparatus of claim 5 wherein the gate means comprises an upper gate portion and a lower gate portion pivotally connected together at adjacent ends with the other end of the upper gate portion pivotally mounted and the other end of the lower gate portion arranged for translatory movement, and wherein means are provided for moving said lower gate portion to pivot said upper gate portion to thereby change the size of the discharge outlet.

8. In combination, a storage receptacle having side and end walls and a floor therein, said receptacle having a discharge outlet in the lower portion thereof, adjustable gate means for varying the size of said discharge outlet, said floor comprising a plurality of stationary and pivotally adjustable members extending longitudinally of the receptacle from a point beyond one end wall thereof to a point adjacent the other end wall, said stationary members being spaced apart from one another and disposed transversely of the side walls, said pivotally adjustable members being positioned in the spaces between said stationary members, feeder means positioned on said stationary and pivotally adjustable members for carrying material in the receptacle to said discharge outlet, and means operatively connected for pivoting adjustable members and feeder means in a vertical direction about an axis adjacent said discharge outlet.

9. In combination, a storage receptacle having side and end walls and a floor therein, means forming a discharge outlet below one of said end walls, agitator means disposed in the receptacle adjacent said one end wall to agitate material therein and prevent it from hanging up against said one end wall, feeder means for carrying material from the receptacle through the discharge outlet, and means operatively connected to said feeder means for pivoting the feeder means in a vertical direction about an axis parallel to said discharge outlet to control the quantity of material carried to the outlet.

10. The combination of claim 9 wherein the agitator means comprises a plurality of vertical chain drives.

11. In combination, a storage receptacle having side and end walls and a floor therein, means forming a discharge outlet below one of said end walls, adjustable gate means for varying the size of said discharge outlet, agitator means disposed in the receptacle adjacent said one end wall to agitate material therein and prevent it from hanging up against said one wall, feeder means for carrying material from the receptacle through the discharge outlet, and means operatively connected to said feeder means for pivoting the feeder means in a vertical direction about an axis parallel to said discharge outlet to control the quantity of material carried to the outlet.

12. In combination, a storage receptacle having side and end walls and a floor therein, said receptacle having a discharge outlet in the lower portion thereof, adjustable gate means for varying the size of said discharge outlet, said floor comprising a plurality of stationary and pivotally adjustable members extending from a point beyond one end wall of the receptacle to a point adjacent the other end wall, said stationary members being spaced apart from one another and disposed transversely of said side walls, said pivotally adjustable members being positioned in the spaces between said stationary members, agitator means disposed in the receptacle adjacent said one end wall to agitate material therein and prevent it from hanging up against said one wall, feeder means positioned on said stationary and pivotally adjustable members for carrying material in the receptacle to said discharge outlet, and pivotal means operatively connected to pivot the adjustable members and feeder means in a vertical direction and about an axis adjacent said discharge outlet.

13. In combination, a container adapted to receive bulk material and having a discharge opening for the material, a floor for said container to support bulk material received in the latter, feeding means in the floor of said container for engaging and feeding bulk material to the discharge opening, and means for displacing said feeding means relative to said floor to vary the amount of bulk material to the discharge opening.

14. In combination, a container adapted to receive bulk material and having a discharge opening for the material, a floor for said container to support bulk material received in the latter, feeding means in the floor of said container and extending through said discharge opening for engaging and feeding the bulk material through said discharge opening, and means for moving the feeding means below the floor and out of engagement with the bulk material except at said discharge opening.

References Cited in the file of this patent

FOREIGN PATENTS

| | | |
|---|---|---|
| 305,343 | Great Britain | Feb. 7, 1929 |
| 1,039,859 | France | May 20, 1953 |

UNITED STATES PATENT OFFICE
CERTIFICATE OF CORRECTION

Patent No. 2,846,089                          August 5, 1958

James M. Stewart

It is hereby certified that error appears in the printed specification of the above numbered patent requiring correction and that the said Letters Patent should read as corrected below.

Column 2, line 8, for "across" read -- cross --; column 3, line 5, for "end wall 1" read -- end wall 13 --; column 6, line 18, for "adjpustable" read -- adjustable --; line 43, for "member" read -- members --.

Signed and sealed this 16th day of December 1958.

(SEAL)
Attest:

KARL H. AXLINE
Attesting Officer

ROBERT C. WATSON
Commissioner of Patents